Figure 1:
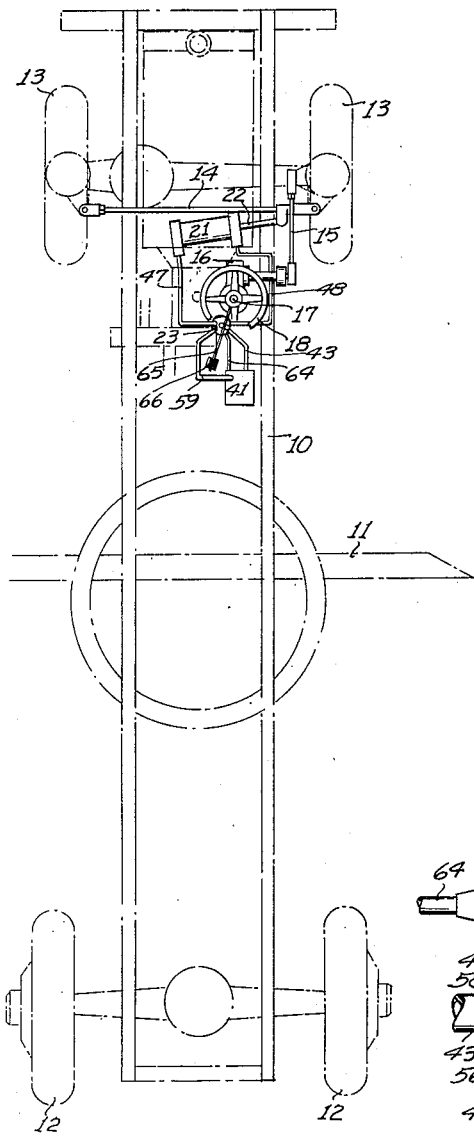

Jan. 30, 1945.  H. HAMILL  2,368,135
STEERING APPARATUS
Filed Sept. 15, 1941   2 Sheets—Sheet 1

HUGH HAMILL
INVENTOR.

BY Harold C. Cook
ATTORNEY

HUGH HAMILL
INVENTOR.

Patented Jan. 30, 1945

2,368,135

UNITED STATES PATENT OFFICE 2,368,135

STEERING APPARATUS

Hugh Hamill, Portland, Oreg.

Application September 15, 1941, Serial No. 410,817

8 Claims. (Cl. 180—79.2)

This invention relates to steering arrangements for automotive vehicles, and, while it is not necessarily limited thereto, it is particularly applicable to vehicles of the heavier type such as trucks, tractors, and power driven road building machinery. It is a general object of the invention to provide a new and improved arrangement of steering gear which includes a power or servo-motor for assisting the operator in the steering control of such a vehicle.

In the operation of automotive vehicles, steering ordinarily is accomplished by means of a hand operated wheel connected to a pair of dirigible wheels. When the vehicle is proceeding along a hard, smooth roadway in a substantially straight direction, the operation of the steering wheel does not ordinarily require the exertion of any considerable physical force on the part of the driver. With certain types of vehicles, however, such traveling conditions are the exception rather than the general rule, and in traveling a tortuous route over rough terrain a much greater steering effort is required of the operator. In the case of a farm tractor or road grader, as specific examples, the vehicle usually is driven rather slowly over relatively soft ground, into which the dirigible wheels sink to a considerable depth so that the resistance to steering is very high. It has been proposed to provide a power drive for the steering gear of such vehicle comprising a servomotor with manually operable valve controls, but such types of control as have been devised are so wholly different from the usual steering wheel type of control that operators experience considerable difficulty in grasping the technique of manipulating such control apparatus.

It has also been proposed to combine a servomotor merely as a booster for the conventional, manually operable steering gear, but in the usual arrangements the feel of the vehicle is almost entirely taken from the operator so that he has little or no sense of the degree of surface resistance between the dirigible wheels and the ground. Thus, if the dirigible wheels have sunk deep into the ground or have otherwise become lodged in a substantially fast condition, full application of power from the servomotor might cause damage to the steering gear. It is desirable, therefore, that the control for the booster servomotor should be so combined with the manual steering wheel that the operator is at all times apprised of the relative amount of power which is being supplied to the turning gear by the booster motor.

It is a further object of the present invention, therefore, to produce a vehicle steering system including a combination of both manual and booster motor means which is so arranged that the operator is always fully aware of the steering resistance.

It is a further object of the invention to provide in a vehicle steering system which includes a servo-motor booster a new and novel control means associated with a manually operable wheel by which the operator is at all times apprised of the position of the dirigible wheels.

It is a still further object of the invention to produce a vehicle steering system, including both manual and power means, by which the steering operation is effected manually during conditions of relatively light resistance to the dirigible wheels, while for greater degrees of steering resistance a servo-motor is automatically rendered operative for assisting in the maneuvering of the dirigible wheels.

These and other objects and advantages are accomplished by the arrangement of the present invention which, according to one form, comprises a manually operable steering wheel which is connected through a resilient lost motion connection to the dirigible wheels of the vehicle in such a manner that a portion of the steering column is shifted axially according to the degree of steering resistance. A control arrangement is provided for the servomotor and which is connected to the movable portion of the steering column for operation thereby in the event that the surface resistance between the dirigible wheels and the earth increases above a predetermined minimum value. The servomotor is energized in accordance with the degree of longitudinal travel of the steering column from minimum to maximum at a progressive rate. The control is also so arranged that the servomotor may be energized to any degree between limits in a substantially steady state condition whereby the dirigible wheels may be held steadily against a more or less continuous side thrust.

Figure 4:
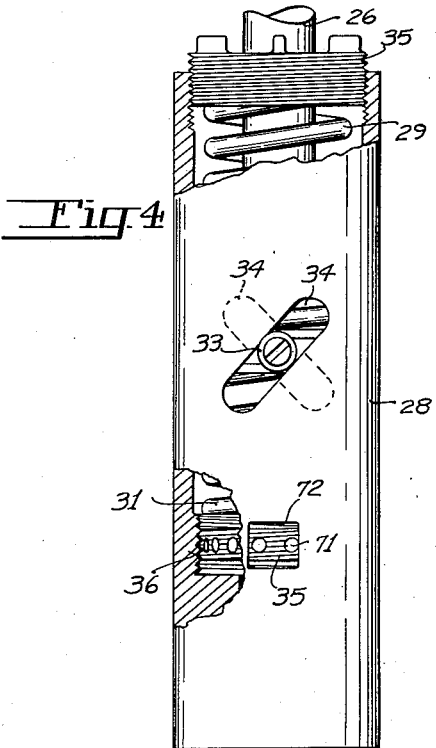
Figure 5:
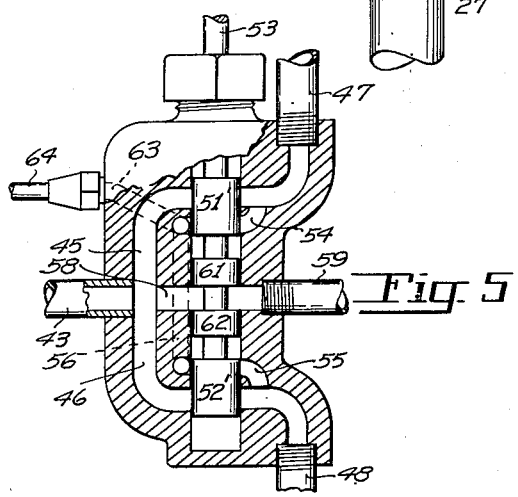
Figure 2:
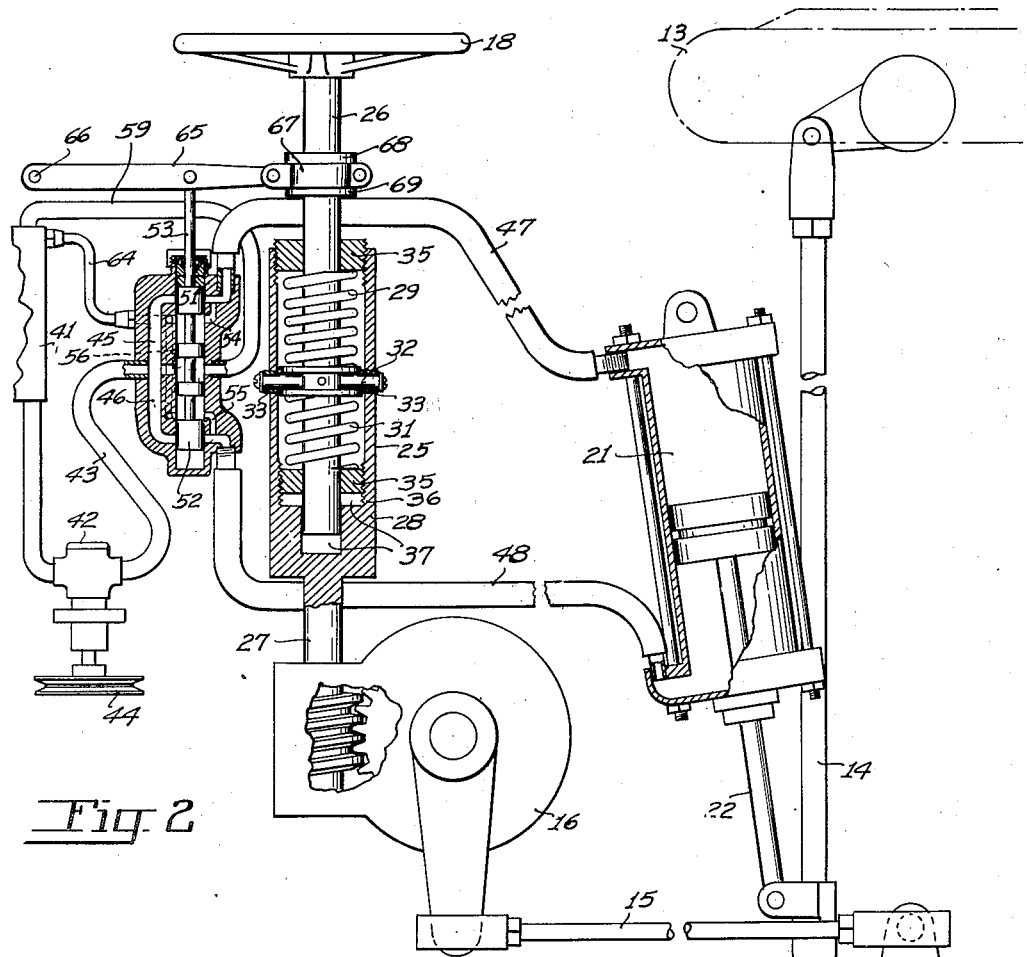
Figure 3:
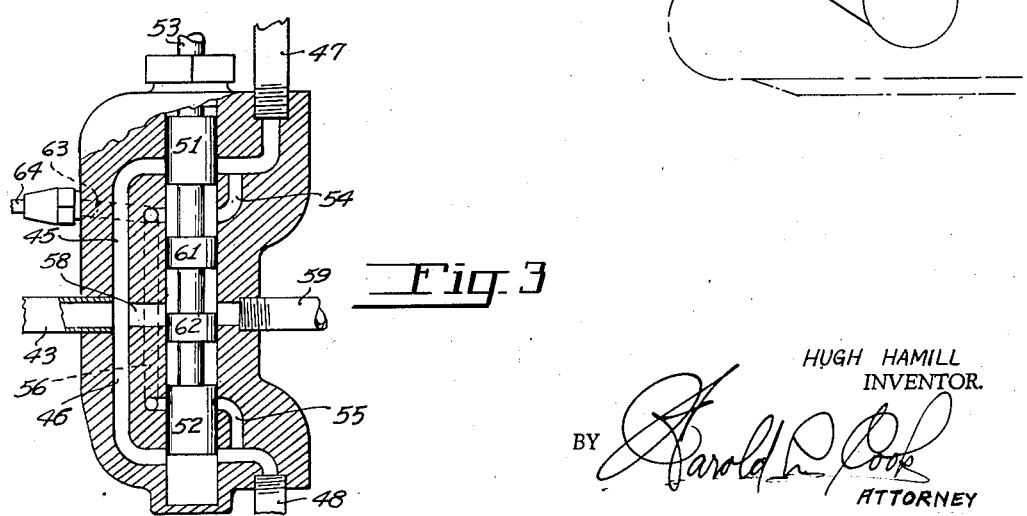

For a consideration of what is believed novel and my invention, attention is directed to the following description and claims appended thereto, taken in connection with the accompanying drawings, in which:

Figure 1 is an outline plan view of an automotive vehicle provided with a steering arrangement constructed in accordance with the present invention; Figure 2 is a diagrammatic apparatus layout illustrating the structural details of the various parts, portions of some of the elements being broken away, and others shown in section, for purposes of greater clarity; Figure 3 is an enlarged sectional view of the control valve embodied in the system of Figure 2 and shown in a second position of adjustment; Figure 4 is a detail view, partly in section, further illustrating the lost motion connection arrangement of the system shown in Figure 2; and Figure 5 is a sectional view of a modified form of a servomotor control valve which may be substituted for that shown in Figure 2.

Referring to the drawings, an automotive vehicle, such as a road grader, is shown comprising a main frame 10 upon which may be mounted a scraper blade 11 and having a pair of front wheels 12 and a pair of rear dirigible wheels 13 by means of which steering of the vehicle is effected. The wheels 13 are connected together by means of a transverse drag link 14 and are further connected through arm 15, worm gearing 16 and steering column 17, for manual control by the hand wheel 18. A booster servomotor 21 is suitably mounted upon the frame 10 and is connected through its piston rod 22 to the drag link 14. The servomotor is adapted to be energized from a suitable source of motive fluid, the flow of which is controlled by means of a valve 23, more clearly shown in Figures 2 and 3.

The guiding movement of the dirigible wheels 13 during conditions of relatively light surface resistance between the wheels and the earth is effected by manipulation of the hand wheel 18, the torque thereof being transmitted through the steering column 17, the worm gearing 16 and arm 15. The steering column 17 includes a lost motion connection, indicated generally at 25, which, for conditions of light steering resistance, is relatively rigid so as to permit the column 17 to act as a single fixed unit. Upon the occurrence of a predetermined steering resistance of the dirigible wheels, the lost motion connection 25 comes into play for effecting a manipulation of the control valve 23 and energization of the servomotor 21.

The steering column comprises an upper shaft portion 26 upon the upper end of which is secured the hand wheel 18, and a lower shaft portion 27 which is connected at its lower end to the worm gearing 16. The lower shaft portion 27 is provided with a cylindrical extension 28 surrounding in a spaced relation the lower end of the shaft 26. Arranged around the shaft 26 within the cylindrical extension 28 are a pair of helical compression springs 29 and 31 arranged respectively on the opposite sides of a pin 32 which extends through and is fixed relative to the shaft 26 at a point intermediate that portion of the shaft 26 which is enclosed within the cylindrical extension 28. The transverse pin 32 is provided at its opposite ends with rollers 33 which are arranged within a pair of diagonally extending slots 34 in the opposite side walls of the cylindrical extension 28, as more clearly shown in Figure 4. Suitable washers may be provided on the opposite sides of the pin 32 forming seats for the adjacent ends of the compression springs 29 and 31, while the opposite ends of the springs are supported by nuts 35 threaded into the upper end of the cylindrical extension and the lower end wall 36, respectively. The shaft 26 is axially movable within the cylindrical extension 28, there being a suitable recess in the lower end of the cylindrical extension, as indicated at 37, for cooperatively receiving the lower end of the upper shaft.

The springs are so adjusted that the rollers on pin 32 extending through the shaft 26 are substantially centered in a floating neutral or central position within the side wall slots 34. The springs are furthermore so adjusted that they will resist deformation, and hence travel of the rollers through the slots 34 upon the application of such a torque to the hand wheel 18 as is normally required for steering the dirigible wheels 13 in traveling over a smooth hard roadway is relatively slight. It will be apparent that with the springs so adjusted, upon a condition of relatively heavy vehicle steering resistance the application of a greater force to the hand wheel 18 will cause a relative rotation between the shaft portions 26 and 27 of the steering column and a compression of one or the other of the springs 29 or 31, depending upon the direction of rotation of the hand wheel 18. Due to the angular slope of the slots 34, the relative rotation between the shaft portions 26 and 27 will be accompanied by an axial movement of shaft 26, the extent of the axial movement being proportional to the amount of force in excess of normal required for effecting the desired movement of the dirigible wheels against the increased steering resistance. This axial movement of the shaft 26 is utilized for controlling the energization of the booster servomotor through a suitable connection with the control valve 23.

Motive fluid for the servomotor 21 is adapted to be supplied from a suitable reservoir 41 under pressure provided by means of a pump 42 arranged in the supply conduit 43, the pump 42 being of any suitable type and adapted to be driven from the vehicle prime mover engine through pulley 44. The supply conduit 43 communicates through branch passages 45 and 46 of the valve 23, with the conduits 47 and 48, respectively, connected to the opposite ends of the servomotor cylinder 21. Fluid flow from the source of supply through the passages 45 and 46 is controlled by valve heads 51 and 52, respectively, provided upon the valve stem 53.

Discharge passages 54 and 55, communicating with the branch passages 45 and 46, respectively, and also controlled by the valve heads 51 and 52, respectively, are interconnected by passage 56 so that when the valve 23 is in the neutral position, with passages 45 and 46 shut off from the supply as shown in Figure 2, fluid may flow freely between the servomotor supply conduits 47 and 48. Thus, during a condition of light steering resistance of the vehicle dirigible wheels, when the valve stem and valve heads remain in the neutral position, the servomotor piston floats in the cylinder, the displacement of the piston being accompanied by free interchange of fluid between the opposite cylinder chambers through passages 54, 55 and 56 of the control valve. During this condition of operation the pressure fluid discharge of the pump 42 is by-passed through valve passage 58 and return conduit 59 to the reservoir 41. The passage 58 is adapted to be controlled by valve heads 61 and 62 also arranged on the stem 53. Passage 58 is also connected to reservoir 41 through passage 63 and conduit 64 for reasons as will be pointed out.

The valve stem 53 is pivotally connected to a lever 65 which in turn is pivoted at one end 66 to the vehicle frame and at the other end to a collar 67 mounted between stops 68 and 69 on the shaft 26. It will be apparent that as the wheel is turned in the clockwise direction against a sufficient resistance, the shaft 26 will be moved axially downwardly, moving the valve stem 53 in a similar direction. Conversely, as the hand wheel 18 is turned in the opposite direction against a heavy resistance the shaft 26 will be moved axially upwardly, and accordingly the valve stem will be moved upwardly also.

Assume now that the steering resistance of the dirigible wheels is relatively great so that upon the application of force to the hand wheel 18 in the counterclockwise direction the spring 29 is compressed causing relative movement between the shafts 26 and 27 and a corresponding upward movement of shaft 26 carrying with it the valve stem in a similar direction. As illustrated in Figure 3, the valve head 52 closes the discharge passage 55 and establishes communication through passage 46 for flow of motive fluid into the lower end of the servomotor cylinder through connection 48. The piston will tend to be moved upwardly and assume the turning effort for the wheels 13, thus unloading the worm gear 16. As the worm gear is unloaded, however, the turning force on the wheel 18 will be diminished, thereby permitting return of the shaft 26 to the neutral position and restoration of the valve to its neutral position. It will be observed that upon movement of the valve stem 53 to the upper position, valve head 51 blocks the supply fluid from passage 45, and fluid forced from the upper portion of the servomotor cylinder is permitted to discharge through the passages 54, 63 and conduit 64 to the supply reservoir. Simultaneously, the by-pass passage 58 is closed by the valve head 62.

Now assume a relatively steady state condition of intermediate steering resistance such as may result from driving the vehicle transversely across a side hill or slope. This condition frequently occurs when working a road shoulder with a grader, and with conventional steering gear requires a continuous physical exertion which is very fatiguing to the operator. With the instant control system, upon the application of force on the hand wheel slightly in excess of that required by the normal light load condition, one of the springs will be just slightly compressed accompanied by a correspondingly small axial movement of the shaft 26. Assuming a direction of turning of the hand wheel 18 as before, the valve head 52 will open only a small crack to the passage 46 so as merely to increase slightly the pressure of motive fluid to the underside of the servomotor piston. The by-pass passage 58 will be only slightly throttled so as to regulate the fluid pressure within the servomotor cylinder to the value sufficient for holding the dirigible wheels in the desired position. During the steady state or holding condition of the wheels 13 there will be substantially no interchange of motive fluid between the opposite sides of the servomotor cylinder, yet a positive pressure will be maintained on one side or the other, as the case may be, to countereffect the relatively steady side thrust. Moreover, it will be observed that it will not be necessary on the part of the operator to jockey the hand wheel 18 back and forth to more or less continue the reversing of the directional force of the servomotor to hold a straight line by a method of averaging the steering movements of the dirigible wheels.

In order to facilitate the adjustment of the neutral position of the upper shaft portion 26, the opposite end abutments 35 and 36 for the springs 29 and 31 within the cylindrical shaft portion 28 may be made adjustable as shown more clearly in Figure 4. These abutments may be in the form of ring nuts threaded into the cylindrical shaft extension, the lower one being provided with a plurality of circumferential holes 71 adapted for cooperatively receiving the end of a suitable wrench through the opening 72. It will be obvious that by varying the compression of the opposed springs, the degree of torque required to be imposed upon the shaft portion 26 to effect a relative movement between the shaft portions may also be adjusted.

In Figure 5 is illustrated a modification of a control valve which may be substituted for valve 23. The instant valve is particularly suitable for use in the system in the event that it is desired for the dirigible wheels to be at all times under the control of the servomotor. It will be recalled that in the system thus far described, the piston of the servomotor floatingly follows the steering movement of the dirigible wheels except when the servomotor is energized. With the instant valve modification embodied in the system, floating of the servomotor piston during the neutral position of the valve is precluded. In this valve, the discharge passages 54 and 55 are both closed during the neutral position of the valve. Otherwise the valve is similar to that previously described. The compression of the springs 29 and 31 of the loose connection 25 between shaft portions 26 and 27 is so adjusted that upon the application of a relatively slight torque to the hand wheel 18, a relative axial movement of shaft portion 26 will take place to effect a corresponding opening of the valve and energization of the servomotor. Shimmying of the dirigible wheels while traveling along a smooth, hard roadway will be precluded with this valve arrangement, while at the same time the steering control is sensitive to slight changes in position of the hand wheel, the power for steering being substantially entirely supplied by the servomotor.

It will be apparent that in the event of failure of fluid pressure for any reason, steering can still be effected manually without requiring any alterations or further adjustments in the system. At the limits of the relative axial displacement between the shaft portions, the rollers 33 engage with the ends of the diagonal slots 34 after which the two shaft portions will rotate together. The valve 23 will operate in such a manner as to permit the servomotor piston to float freely in its cylinder and not interfere with the manual steering of the dirigible wheels.

Having described my invention in what I consider to represent a preferred embodiment thereof, I desire to have it understood that the specific structure disclosed is merely illustrative and that the invention may be carried out in other ways.

I claim:

1. Steering apparatus for motor vehicles comprising a vehicle steering member, means for operating said member manually including a wheel and first and second axially aligned shafts, one of said shafts being movable along its longitudinal axis in either direction from a neutral position in response to a predetermined torque applied to said wheel, means for operating said member by power including a motor having a movable element connected with said member, valve means for controlling the passage of motive fluid to and from said motor when said predetermined torque is exceeded, and means operatively connecting said valve means and said one shaft whereby said valve means is operated in accordance with longitudinal movements of said shaft.

2. Steering apparatus for motor vehicles comprising a steering member, means for operating said member manually including a wheel and first and second axially aligned shafts, one of said shafts being movable axially in response to a torque applied to said wheel, spring means biasing said shaft to an intermediate neutral position between limits of axial movement, motor means including an actuating element connected with said member, and valve means for controlling the passage of motive fluid to and from said motor, and means connecting said valve means with said movable shaft for adjustment in response to axial movements of said shaft from said neutral position.

3. Steering apparatus for motor vehicles comprising a steering member, means for operating said member manually including a steering wheel and first and second axially aligned shafts, gearing between said first shaft and said member, a loose connection between said first and second shafts whereby said second shaft is movable along its longitudinal axis between predetermined limits in either direction from a neutral position in response to a predetermined torque applied to said wheel, motor means connected to said member, and control means for said motor responsive when said predetermined torque is exceeded connected to said second shaft for operation thereby in response to a predetermined movement of said shaft from said neutral position.

4. Steering apparatus for motor vehicles comprising a steering member, a manually operable steering wheel, first and second axially aligned shafts operatively connecting said wheel and said member, said shafts being relatively movable along their longitudinal axes in response to a predetermined torque applied to said wheel, motor means connected to said member, and means operatively associated with one of said shafts and responsive when said predetermined torque is exceeded for controlling the energization of said motor, said last mentioned means being operable in response to relative movement between said shafts.

5. Steering apparatus for motor vehicles comprising a steering member, a manually operable control wheel having axially aligned shafts rotatable therewith, one of said shafts being movable axially between limits in response to torque applied to said wheel, a servo-motor connected for operating said member, a control valve for said servo-motor, means connecting said movable shaft and said valve whereby said valve is opened in response to axial movements of said shaft by said wheel, and means operatively connected to said member for effecting return of said shaft to neutral position in response to movement of said member by said motor.

6. Steering apparatus for motor vehicles comprising a steering member, a manually operable wheel for operating said member, a shaft for said wheel, a loose connection between said shaft and said member, said connection including means providing for limited longitudinal movement of said shaft from a predetermined neutral position in either direction in response to predetermined torque applied to said wheel, motor means for operating said member, and controlling means for said motor effective when said predetermined torque is exceeded and operatively connected to said shaft whereby said motor is energized in accordance with the direction of longitudinal movement of said shaft and in accordance with the degree of movement thereof from said neutral position.

7. Steering apparatus for motor vehicles comprising a steering member, a manually operable wheel for said member, first and second axially aligned shafts between said wheel and said member, said first shaft having a sleeve portion concentrically surrounding the adjacent end portion of said second shaft, a transverse pin extending through said second shaft end portion, the outer ends of said pin extending through diagonal slots in said sleeve portion, spring means arranged within said sleeve around said shaft end portion and engaging said pin for normally biasing said second shaft and said pin to an intermediate neutral position, one of said shafts being movable axially between limits of said slots in response to a predetermined torque applied to said wheel, motor means for operating said member, and controlling means for said motor connected to said axially movable shaft for actuation thereby.

8. Steering apparatus for motor vehicles comprising a steering member, means for operating said member manually including a steering wheel, a loose connection between said wheel and said member permitting limited axial movement of said wheel from a neutral position in response to a predetermined torque applied thereto, means engaging said wheel and said member across said loose connection for normally biasing said wheel and said member to said neutral position wherein said parts act as a single fixed unit, a servo-motor including a piston connected to said member, a source of pressure fluid for said servo-motor, a valve operatively connected to said wheel for controlling the supply of pressure fluid to said motor, passages in said valve interconnecting the servo-motor chambers on opposite sides of said piston in the neutral position of said valve.

HUGH HAMILL.